Figure 1:
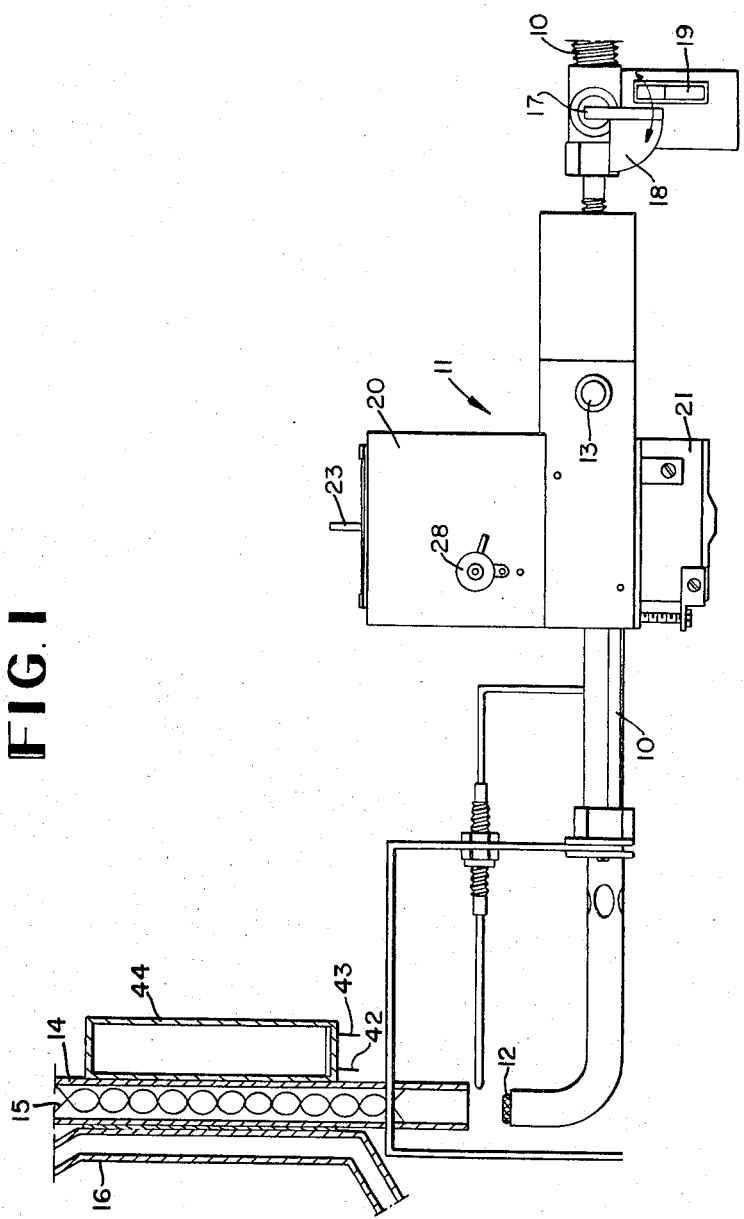

United States Patent [19]
Ellstrom

[11] 3,778,591
[45] Dec. 11, 1973

[54] CONTROL APPARATUS FOR A COOLING DEVICE

[75] Inventor: Johan Ragnar Ellstrom, Bromma, Sweden

[73] Assignee: Junkers & Co. G.m.b.H., Wernau, Germany

[22] Filed: June 28, 1971

[21] Appl. No.: 157,219

[52] U.S. Cl. ............ 219/279, 62/236, 236/99, 337/2
[51] Int. Cl. ............................................. F25b 27/00
[58] Field of Search ............... 219/279, 474, 496; 337/1, 2, 3; 62/236, 148, 208, 209; 236/99, 86, 102

[56] References Cited
UNITED STATES PATENTS

| 3,105,363 | 10/1963 | Von Der Scher | 219/279 UX |
| 2,994,755 | 8/1961 | Hildenbrandt et al. | 236/99 X |
| 3,108,747 | 10/1963 | Nielsen | 236/99 |
| 2,800,284 | 7/1957 | Weber et al. | 236/99 |
| 1,629,064 | 5/1927 | Bitzel | 236/86 |
| 3,166,120 | 1/1965 | Butterfield et al. | 219/279 UX |

*Primary Examiner*—Bruce A. Reynolds
*Attorney*—V. Alexander Scber

[57] ABSTRACT

A control apparatus designed to control the flow of a gas from an inlet to an outlet is shown. The control apparatus includes a housing provided with switch means operatively connected thereto. A gas filled closed member is connected to a bellows with the bellows being responsive to pressure changes within the gas filled member. A gear is connected to a worm screw which in turn is connected to the housing. The gear is also connected to a valve spindle which in turn is connected to control mechanism and to a selectively openable and closeable valve.

7 Claims, 4 Drawing Figures

CONTROL APPARATUS FOR A COOLING DEVICE

DESCRIPTION OF THE INVENTION

The present invention relates to improvements in control apparatus, and more particularly to means for operating cooling apparatus having a closed system containing a medium to be heated, said control apparatus comprising a thermostat and an evacuated gas-filled member, where by differential pressures arising in said element via bellows and by means of a device operable by a screw connection, activate a spring biassed valve cone of the thermostat for controlling the supply of gas from a pressurized gas source which gas is guided in conduits and arranged to be ignited and to heat said medium in the closed system.

Control apparatus of this kind are used for instance in refrigerators intended to be connected to a pressurized gas source, such a source of gaseous butane or propane. The object of the invention is to enlarge the range of the use for control apparatus of the mentioned kind and, more particularly, the invention contemplates to make possible, by simple means, the selective use of electric current or gas as the power source for refrigerators. Said object is according to the invention attained, in a control apparatus of the specified kind, therby that said thermostat is connected to a microswitch, the contact of which being operable for breaking and closing the electric current, by end of a spindle means, the other end of which is in engagement with the lower part of said valve cone which is spring biassed and indirectly operable by screw connection, and wherein the microswitch is, via leads, electrically connected with means for heating the medium contained within said closed system.

Other characteristic features of the invention will be described in connection with the attached drawings which illustrate an embodiment of the control apparatus according to the invention cooperating with a refrigerator.

Figure 2:
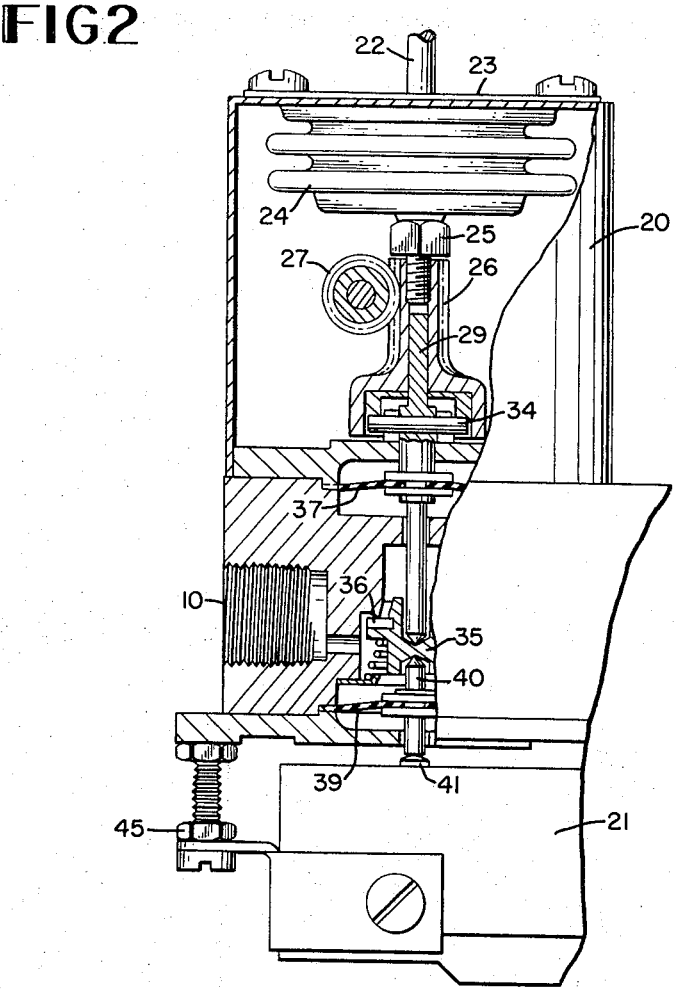
Figure 3:
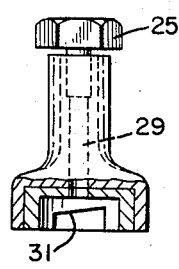
Figure 4:
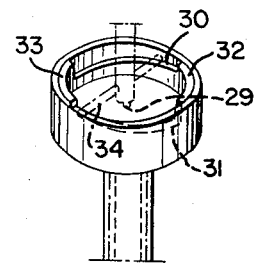

In the drawings:

FIG. 1 is a diagrammatic side view of the control apparatus according to the invention. FIG. 2 is a sectional view of the thermostat housing of the control apparatus. FIG. 3 and FIG. 4 are respectively a sectional and a perspective view of a gear actuated by the bellows.

A power source (not shown) containing pressurized gaseous propane or butane is provided with a gas conduit 10 and is moreover connected to the one end of a control apparatus, generally designated by 11, through which the gas is passed. The gas conduit 10 is also connected to the gas outlet at the opposite end of the control apparatus and discharged and ignited, in a manner known per se, by an ignition control means 13 and a pilot flame (not shown) or in any other way. The heat from the burning gas is conducted upwardly through a central tube 14, provided in its interior with a diffuser 15 for heating the medium in boiler tube 16 of the closed system in a cooling apparatus of the absorption type. Gas conduit 10 is provided with manually operable cut-off valve 17 which is situated at the up-stream end of the control apparatus 11 and has a locking means 18 cooperating with an electric switch 19 of any conventional design. The object of this switch 19 will appear below.

The control apparatus (FIG. 1) comprises a thermostat housing 20 the bottom of which is provided with a micro switch 21 cooperating with thermostat housing 20 in a manner described below and also electrically connected with swich 19.

Thermostat housing (FIG. 2) is provided with a tubular member 22 filled with gas after evacuation. One end of the tubular member 22 penetrates cover 23 of the thermostat housing 20 and is connected to bellows 24. The other end of the tubular member 22 is connected to a thermal control assembly (not shown). Upon changes in temperature sensed by said control assembly, gas in the tubular member 22 and bellows expands and contracts forcing bellows 24 to move in the vertical direction. An adjusting screw 25 is in contact with the lower part of bellows 24 and screwed into the upper end of a central bore of a gear member 26. The lower enlarged part of gear 26 has a circular recess provided with two mutually opposed sliding surfaces 30, 31 and two mutually opposed stopping faces 32, 33 (FIG. 3 and 4). Sliding surfaces 30, 31 have a predetermined pitch angle.

The central bore of gear 26 carries one end of a valve spindle 29, which has a bore through which a pin 34 engages the sliding surfaces 30, 32. The other end of the valve spindle 29 operates on a spring biased valve cone 35, movable toward and away from the seat 36.

Valve spindle 29 is attached to a diaphragm 37. The lower pressure chamber of diaphragm 37 is exposed to the inlet gas pressure, whereby diaphragm 37 and spindle 29 are lifted pressing pin 34 against the slide surfaces 30, 31 of gear 26.

A worm screw 27 is arranged at right angles to gear 26 and is in engagement therewith. Worm screw 27 is journalled in a wall of thermostat housing 20 and operable from outside by a control means 28 (FIG. 1). The control temperature point is adjusted by turning the control and adjusting means 28, 27, producing a rotational movement of gear 26. By rotating gear 26, slide surfaces 30, 31 act on pin 34, whereby the valve spindle 29 is displaced toward and away from valve cone 35. During further operation of control apparatus 11 the worm screw 27 remains fixed in the adjusted position.

When the temperature in the refrigerator is lower than the adjusted control-point, bellows 24 is contracted and valve cone 35 is in a closed position, as shown in FIG. 2.

If temperature at the measuring point increases, bellows 24 expands and moves gear 26 as well as valve spindle 29 downwards. When the measuring temperature reaches the control point the lower end of spindle 29 touches valve cone 35, whereby by further displacement of spindle 29 valve cone 35 is moved away from seat 36 permitting the gas to flow to the outlet 10 and nozzle 12 (FIG. 1). The linear displacement of gear 26 is combined by a rotational movement caused by the engagement of the inclined teeth of gear 26 with the fixed worm screw 27, whereby further linear displacement is added to valve spindle 29, in a way described above.

By combining the thermostat device described with some simple additional members the control apparatus may also be connected to the lighting network and the wanted operation may be obtained as hereinafter described.

A sealing member 39 is arranged below the valve cone through which member a valve spindle means 40 is inserted. The upper portion of this member is in engagement with a recess in the bottom portion of the valve cone 35 and projects from the bottom side of thermostat housing 20 and is moreover in contact with a contact means 41 of microswitch 21 which is attached by screw means 45 to the bottom of the thermostat housing 20. Said microswitch 21 is, via leads 42, 43 (FIG. 1), electrically connected with a heater 44 positioned in such a manner that the heat delivered therefrom can heat boiler tube 16 and also the medium contained therein analogous to the process described above in connection with gas operation.

It is obvious that in this case by variation of the pressure in member 22 and bellows 24 due to variation of measuring temperature, the displacement of valve cone 35 is directly transferred to lower valve spindle 40, which effects contact means 41 of microswitch 21 opening or closing current flow to heater 44. Spindle 40, by differential pressure in member 22, will be influenced by the movements of the valve cone 35 and will close or break current to the heater 44 via contact means 41 of microswitch 21 and the latter is by means of screw joint 45 attached to the bottom portion of thermostat housing 20.

A cooling apparatus, for instance mounted in a caravan, may thus, by use of very simple means, be operated during travelling by a source of pressurized gas and may be connected to the lighting network, e.g., during stops at camping places. In order to obviate connection to the lighting network with the gas supply active or vice versa the main valve 17 of gas source is arranged near the switch 19 and provided with a locking plate 18 which acts as a stop preventing unintended connection of gas or current.

Switch 19 is, as usual, connected to electrical leads (not shown) having a plug for connection to the lighting network.

I claim:

1. A control apparatus for a cooling device, said cooling device including a closed element having a heatable medium therewithin which heatable medium is optionally controlled in temperature by ignitable burnable pressurized gas, heating means or electrical heating means, said cooling device also including a pressurized gas source and conduit means adapted to carry said pressurized gas into said closed element, electrical connector, switching and lead means, and selector means for selecting gas or electrical heating for said heatable medium, and said control apparatus including an evacuated gas filled member having a bellows operatively connected thereto and responsive to differential pressures within said gas filled member, a worm screw connected to the lower end of said bellows, a gear provided with a central bore connected to said worm screw, a first valve spindle located within said central bore of said gear, said first valve spindle being operatively connected with valve seat means, the lower portion of said gear being also provided with a recess having two mutually opposed sliding surfaces of a predetermined pitch angle and limited by two mutually opposed stops, a pin carried by said first valve spindle adapted to engage the sliding surfaces of the gear, a spring biased valve cone operatively connected to said first valve spindle, a second valve spindle operatively connected to said valve cone and electrically operated switch means connected to said second valve spindle.

2. A control apparatus as claimed in claim 1, characterized in that the upper portion of said gear (26) is provided with a device (25) for adjusting the distance between the gear (26) and the bellows (24).

3. A control apparatus as claimed in claim 1 wherein the upper portion of said second valve spindle is positioned below the valve seat and the lower end of said second valve spindle is adapted to operate a movable contact.

4. A control apparatus, for cooling apparatus of the type used in absorption refrigerating systems, having a closed system containing a medium to be heated, said control apparatus comprising a thermostat, and a gas-filled member, where a variation in gas pressure in said member operates a spring biased valve cone via bellows and means operable by a screw connection for controlling the supply of gas from a pressurized source which gas is guided in conduits and arranged to be ignited and to heat said medium in the closed system, said thermostat being connected with a microswitch arranged axially, under the valve housing the contact of which is operable, for breaking and closing the electric current, by one end of a spindle means, the other end of which is in engagement with the lower part of said valve cone, and wherein the microswitch is, via leads, electrically connected with means for heating the medium contained within said closed system.

5. A control apparatus as claimed in claim 4, whereby the lower end of said bellows affects a gear in an axial direction and that said gear is engaged in such a way with a worm screw that the motion imparted to said gear to helicoidel.

6. A control apparatus as claimed in claim 5, wherein said gear has a central bore for one end of a member acting as a valve spindle, the other end of which cooperates with a spring biased valve cone and wherein the valve spindle is arranged to open or close a valve seat in response to the motion imparted to said gear.

7. A control apparatus as claimed in claim 6, wherein the lower portion of said gear is provided with a recess having two mutually opposed sliding surfaces of predetermined pitch angle and limited by two mutually opposed stops and wherein said valve spindle is provided with pin penetrating therethrough and arranged to engage the sliding surfaces of the gear.

* * * * *